ARTHUR L. CARTER
BURTON C. GIBBONS
INVENTORS

BY
ATTORNEYS

United States Patent Office 3,242,971
Patented Mar. 29, 1966

3,242,971
CONCENTRATION CONTROL FOR CENTRIFUGAL WIPED-FILM EVAPORATORS
Arthur L. Carter and Burton C. Gibbons, Rochester, N.Y., assignors to Eastman Kodak Company, Rochester, N.Y., a corporation of New Jersey
Filed Mar. 22, 1963, Ser. No. 267,272
1 Claim. (Cl. 159—44)

This invention relates to a process of controlling thin film evaporators to obtain uniform product concentrations.

Miller et al. U.S. Patent 3,017,289 disclose the concentration of photographic emulsions with a thin film evaporator, such as an apparatus of the type described in U.S. Patent 2,596,086 of Müller, and extruding the concentrated product onto a suitable support such as paper or film base. In the concentration of photographic emulsions, as well as various other liquids, it is important that the product is concentrated to a uniform concentration. One method of obtaining uniform product concentration in such evaporators is described in Miller et al. patent application Serial No. 113,985, filed May 11, 1961, now abandoned. In the technique disclosed in that application, the product concentration is controlled by determining the liquid level in the outlet of the evaporator by means of a pressure level sensing device, signaling any change of liquid level thus determined through a differential pressure transmitter to a steam controller whereby heat input to the evaporator is increased or decreased as liquid level of the outlet raises or lowers so as to adjust the liquid level in the outlet of the evaporator. While good results are obtained with this method of controlling product concentration, it is desirable that better uniformity of product concentration be achieved in certain instances.

One object of our invention is to provide a method of controlling thin film evaporators to obtain uniform concentration of product. Another object of our invention is to provide a control of the product concentration of thin film evaporators which involves repeatedly measuring the rotor shaft power of the evaporator and causing increases or decreases in the heat supplied to the liquid in the evaporator in accordance with these measurements. Other objects of our invention will appear herein.

We have found that a wide variety of liquids may be uniformly concentrated by means of a thin film evaporator by adjusting the steam temperature of the evaporator in relation to the power required to rotate the rotor shaft of the evaporator.

Figure 1:
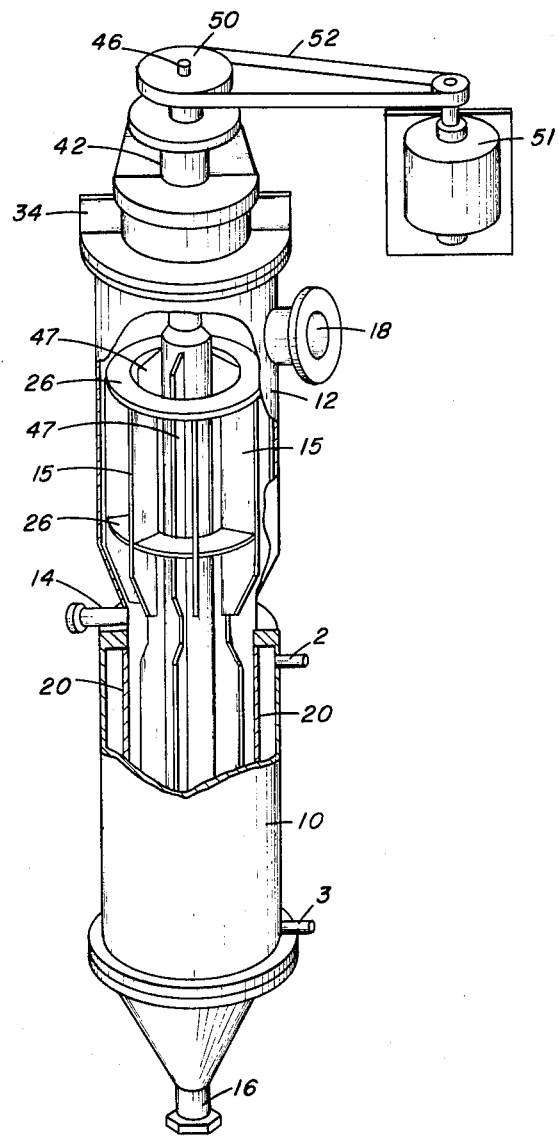
Figure 2:
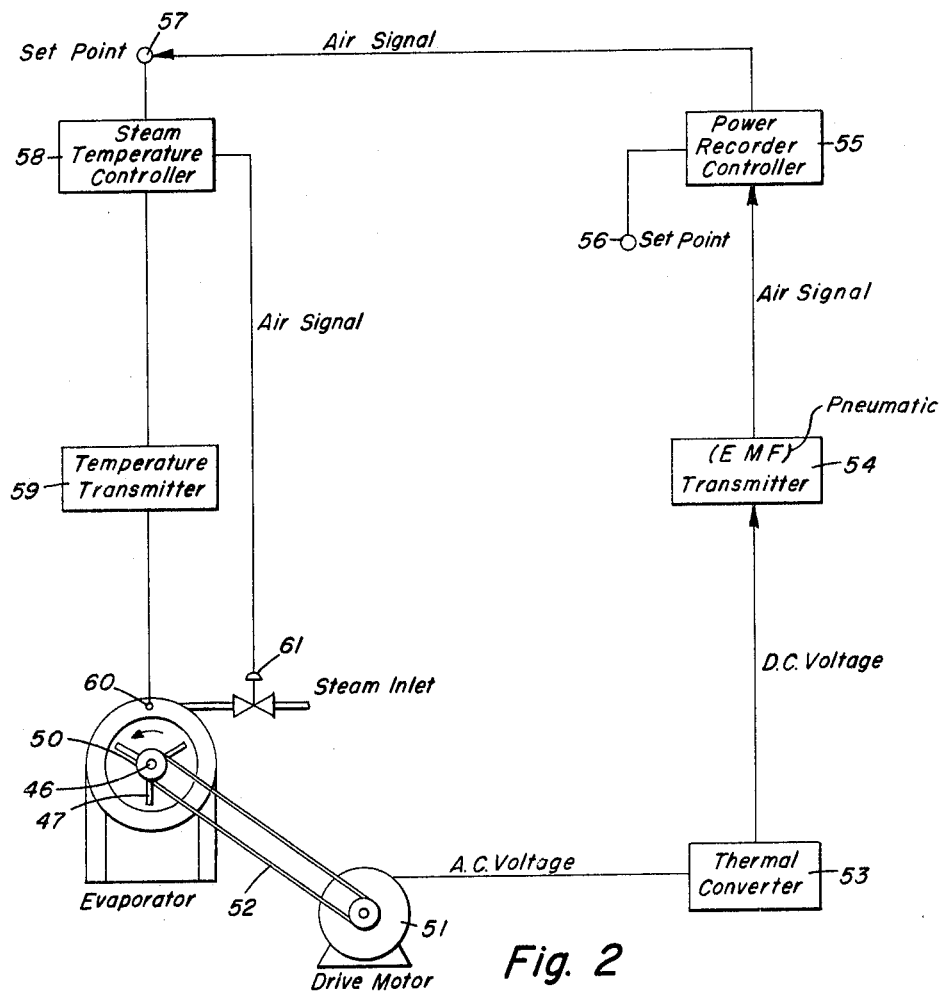

Our invention will be better understood by the accompanying drawings. FIG. 1 shows partly in section and partly in elevation the thin film evaporator into which the fluids to be concentrated are introduced. FIG. 2 is a flow sheet illustrating the arrangement of the product concentration control system.

Referring particularly to FIG. 1, the lower portion of the device indicated generally at 10 is the evaporator portion of the apparatus and the upper portion indicated generally at 12 is the separator portion thereof. The liquid to be concentrated is introduced through a pipe or fitting 14 which is generally located between the evaporator 10 and the separator 12. The liquid introduced at this point flows down the evaporator 10 by gravity. The concentrated liquid is drained off by a pipe 16 at the bottom of the evaporator 10 and the water vapor formed is discharged through a pipe or conduit 18 in the upper portion of the separator 12. The evaporator part has a wall 20 which is normally cylindrical throughout its entire length, although it is to be understood that the term "cylindrical" when applied to the evaporator would include also a tapered or conical form of wall. The wall 20 is heated by means of a steam jacket with which the evaporator portion is supplied, which steam jacket has a steam inlet 2 and outlet 3.

The separating chamber 12 may be a continuation of the evaporating chamber 10 or preferably is larger in diameter than that chamber. It is provided with fins 15 held in place by reinforcing rings 26. The cap 34 is removably secured to the top of the separator portion 12, which cap carries a bearing housing and bearing 42 at its upper end to hold shaft 46 which is rotatably mounted therein. The housing and bearing are provided with oil seals at their upper and lower ends to prevent leakage of oil along the shaft in the well known manner. The apparatus is constructed to retain the differential in pressure between the outside and inside of the chamber of the connecting apparatus.

The apparatus is provided with a rotor, fitted with blades or vanes 47, which vanes extend continuous longitudinally in the lower portion and are in close proximity to the wall 20 of the evaporating chamber. The clearance between the vanes 47 and the wall 20 is kept as small as possible within reasonable mechanical limitations. Any number of vanes may be used, but because of the small clearances, it is important that the rotor be balanced and the vanes thereof be symmetrically disposed thereon. The apparatus is operated in vertical position and provided with mounting brackets, not shown, to hold the apparatus in stationary condition. The shaft 46 is provided with a pulley 50 above the bearing housing and is driven by a suitable source of power such as a constant speed electric motor 51, which transmits power to the rotor shaft 50 through belt 52. In use, the rotor is rotated at a constant speed but the exact speed of the rotation is not critical. Successful operation has been carried out with a circumferential rotor speed of 25–60 feet per second. Although the concentrator is shown in vertical position, it may instead be positioned in an inclined or horizontal position.

FIG. 2 is a flow sheet illustrating the arrangement of the product concentration control system in a typical embodiment of the invention. Marked are the vanes 47 of the evaporator mounted on shaft 46 which is provided with a pulley 50 driven by belt 52 with a constant speed drive motor 51. The rotor power wattage required by the motor 51 to drive the shaft 46 at a constant rate is sensed by the thermal converter 53 which generates a D.C. voltage, proportional to the wattage required by the motor 51, which is delivered to pneumatic transmitter 54, which transmits an air signal, proportional to the D.C. voltage received by it, to the power recorder controller 55. The power recorder controller 55 emits a pneumatic signal proportional to the difference between its set point 56 and the output of the pneumatic transmitter. The air signal thus emitted from the power recorder controller 55 controls the set point 57 of the steam temperature controller 58. The steam temperature controller 58, in connection with temperature sensor 60 in the steam jacket of the evaporator, the temperature transmitter 59 and the pneumatically operated steam inlet valve 61 controls the steam jacket temperature.

In operation, a rise in the rotor power increases the output to the power recorder controller which reacts to adjust the set point 57 of the steam temperature controller 58, to cause a decrease in the amount of steam entering the steam jacket. Thus, less heat is transferred to the material being processed and the product concentration viscosity is lowered to a level where the power consumed by the rotor matches the desired level as indicated by the power recorder controller set point 56. Conversely, a drop in the power required to turn the rotor 46 lowers the output to the power recorder controller 55 which in turn causes an increase in the amount of steam entering the steam jacket. A greater amount of heat is transferred to the material being processed and the product concentration viscosity is raised to a level where the power consumed by the rotor matches the desired level as indicated by the power controller set point 56.

The thermal converter 53, pneumatic transmitter 54, power recorder controller 55, steam temperature controller 58, steam temperature transmitter 59 and temperature sensor device 60 are all well known measuring, sensing and transmitting devices. For example, the thermal converter and pneumatic transmitter may be obtained commercially from the Foxboro Company, Foxboro, Massachusetts, the power recorder controller, steam temperature recorder controller, and the temperature transmitter may be obtained from the Taylor Instrument Company, Rochester, New York.

The mechanical energy used to turn the rotor in a thin film evaporator is dissipated as heat in the fluid being processed. This adds additional heat to that supplied through the evaporator wall 20 to evaporate solvent from the fluid. During operation, any change in the processing conditions which causes an increase in rotor power consumption increases evaporation of solvent, thereby increasing the viscosity of the material being processed and causing an additional increase in rotor power consumption. When concentrating material to a point near where the product is so viscous that it stops being fluid, this cycle may be repeated and cause the material to stop flowing in the evaporator. When this occurs, the product may be damaged by overheating; the inside of the evaporator contaminated, necessitating cleaning; and, in some cases, the heat transfer surface may be damaged. These difficulties are prevented by the present invention which uses rotor power consumption to control steam jacket temperature. This is a dynamic system which has a much faster response to product viscosity changes than other control systems which depend upon heat or material balances over the evaporator.

Our invention will be further illustrated by the following examples. In these examples, the thin film evaporator employed was a reverse taper unit having a mean diameter of 14.34 inches, a heat transfer surface of 10.30 square feet, and was obtained from the Kontro Co., Inc., Petersham, Massachusetts. The thermal converter and the pneumatic transmitter were obtained from the Foxboro Company, Foxboro, Massachuetts, the power recorder controller, steam temperature controller and temperature transmitter were obtained from the Taylor Instrument Company, Rochester, New York.

*Example 1*

A gelatin silver halide photographic emulsion was concentrated from 11.0 to 44.3% solids with a steam jacket temperature of 217° F. and a vapor temperature of 115° F. The total rotor power was recorded and controlled at 11.6 kw. for a product viscosity of 30,000 cps.

*Example 2*

A gelatin silver halide photographic emulsion was concentrated from 11.5 to 24.7% solids with a steam jacket temperature of 178° F. and a vapor temperature of 105° F. The total rotor power was recorded and controlled at 5.7 kw. for a product viscosity of 400 cps.

*Example 3*

A baryta coating solution comprising barium sulfate in gelatin solution was concentrated from 42.5 to 71.5% solids with a steam jacket temperature of 167° F. and a vapor temperature of 105° F. The total rotor shaft power was recorded and controlled at 12.0 kw. for a product viscosity of 37,500 cps.

The concentration of products using a thin film evaporator and controlling means in accordance with our invention has been found to be a good method for controlling product viscosity over a wide range, such as 100–100,000 cps., with feed viscosities of various concentrations, as 10–25 cps. The control mechanism of our invention has been successfully used for processing gelatin solutions to a product concentration in the range of 20–50% solids and concentrating baryta coatings (barium sulfate and gelatin mixtures) up to 72% solids solutions.

A wide variety of liquids may be concentrated with thin film evaporators to uniform concentration using the control mechanism of our invention. Particularly good results have been achieved with photographic gelatin silver halide emulsions and baryta coatings.

The invention has been described in detail with particular reference to preferred embodiments thereof but it will be understood that variations and modifications can be effected within the spirit and scope of the invention as described hereinabove and as defined in the appended claim.

We claim:

In an apparatus for concentrating liquids of the type having a thin film evaporator, a rotor driven at a constant speed for agitating the liquid, drive means for rotating the rotor and heat supply means including a steam jacket and pneumatically controlled steam supply valve for conducting heat to the liquid through the walls of the evaporator, the improvement in regulating the amount of heat supplied to the liquid in the evaporator to obtain a product of uniform concentration comprising, in combination:

(1) temperature control means for regulating the heat supplied to the evaporator; said temperature control means including a temperature detecting signal generator in the evaporator steam jacket, a temperature transmitter responsive thereto and a steam temperature controller having a set point and transmitting a pneumatic signal to the valve to cause a predetermined amount of steam to be supplied to the jacket;

(2) sensing means for measuring increases and decreases in the power required to rotate the rotor and generating a signal proportional to the power requirement; and (3) signal transmitting means and recorder control means having a set point responsive to said sensing means for generating a signal proportional to the difference between its set point and the set point of the steam temperature controller to cause, respectively, decreases and increases in the amount of heat supplied to the liquid via the valve in proportion to the increases and decreases in power required to rotate the rotor.

References Cited by the Examiner

UNITED STATES PATENTS

| | | | |
|---|---|---|---|
| 1,835,621 | 12/1931 | Webre | 159—44 |
| 2,325,573 | 7/1943 | Thompson et al. | 73—59 X |
| 2,452,142 | 10/1948 | Pecker | 73—59 X |
| 2,540,146 | 2/1951 | Strober. | |
| 2,745,484 | 5/1956 | Eckstrom | 159—44 |
| 2,812,019 | 11/1957 | Rasmussen | 159—6 |
| 2,850,086 | 9/1958 | Sanscrainte | 159—44 |
| 2,900,334 | 8/1959 | Miller. | |
| 2,904,664 | 9/1959 | Rothacker. | |
| 3,017,289 | 1/1962 | Miller et al. | 159—6 |

NORMAN YUDKOFF, *Primary Examiner.*

ROBERT F. BURNETT, *Examiner.*

J. SOFER, *Assistant Examiner.*